July 21, 1970     J. E. ORT     3,521,400
UNBALANCED CULTURE METHOD OF ALGAE PRODUCTION
Filed Oct. 18, 1967     2 Sheets-Sheet 1

INVENTOR
Jay E. Ort

BY
ATTORNEY

July 21, 1970 J. E. ORT 3,521,400
UNBALANCED CULTURE METHOD OF ALGAE PRODUCTION
Filed Oct. 18, 1967 2 Sheets-Sheet 2
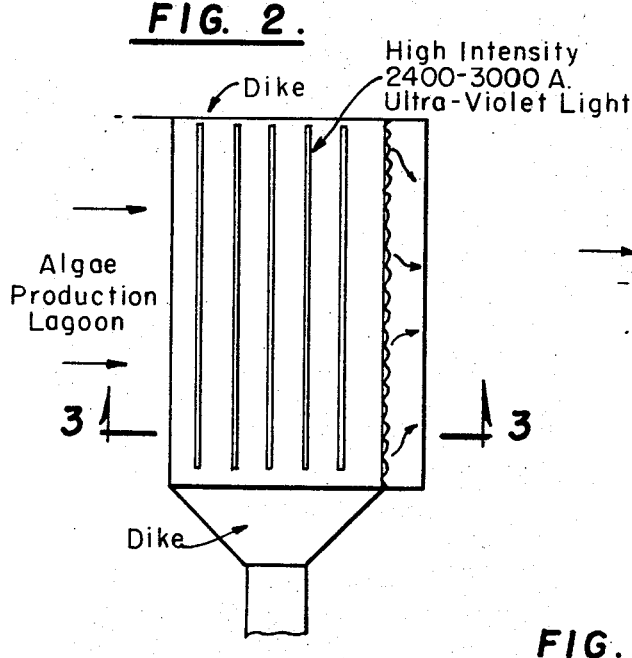
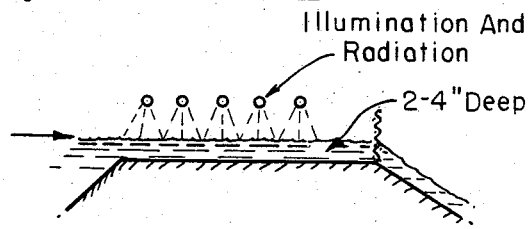
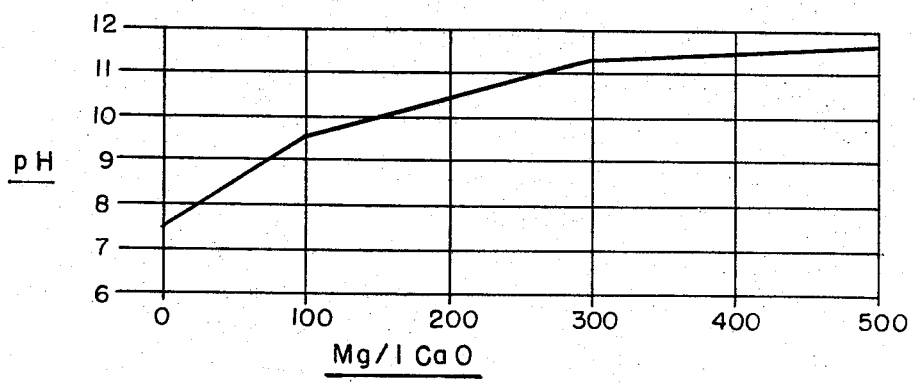
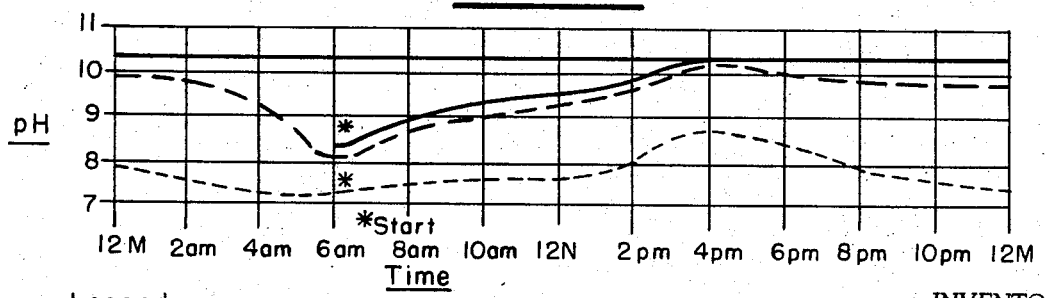
Legend
------ Normal Balanced Culture
— — — Unbalanced Culture
——— Unbalanced Culture-Illuminated
INVENTOR
Jay E. Ort
BY J. W. Aisenberg
ATTORNEY United States Patent Office 3,521,400
Patented July 21, 1970

3,521,400
UNBALANCED CULTURE METHOD OF ALGAE PRODUCTION
Jay E. Ort, Roswell, N. Mex., assignor to ERA Incorporated, Clovis, N. Mex., a corporation of New Mexico
Filed Oct. 18, 1967, Ser. No. 676,195
Int. Cl. C02c *1/00*
U.S. Cl. 47—1.4    12 Claims

ABSTRACT OF THE DISCLOSURE

Interrupting algal-bacterial symbiosis after five days by treatment with 2537 Angstrom high-intensity light over a 2- to 3-inch deep channel permits increased algae production and 24-hour harvesting.

---

This invention relates to the production of algae for feedstuffs. Mose particularly, the invention is concerned with efficient separation of algae from symbiotic cultures. As a byproduct waste water is made reusable. The import of this is seen from the United States Department of the Interior Publication, "New Water For Old," WP–19, Government Printing Office, 1966.

Considerable research has been conducted for separating suspended algae from water. This is reflected, e.g., in U.S. Pat. No. 2,867,945. Commonly employed methods include: chemical flocculation, flotation, filtration, and centrifugation. This new method uses a biochemical flocculation process.

One object of this invention is to provide a highly efficient means of separating algae from water.

Another object is to produce an algae feedstuff which is relatively free from residual chemicals or minerals.

Another object is to produce a high quality reclaimed water suitable for industrial or other use.

A further object is to produce softened water.

An additional object is to effect a feasible means of water pollution control.

Other objects, together with the foregoing, are attained in the process described in the accompanying description and illustrated by drawings, in which—

FIG. 2 is a plan view of the disinfector.

FIG. 3 is a profile view of the disinfector.

FIG. 4 is a correlation between pH and lime concentration.

FIG. 5 illustrates pH fluctuation for balanced and unbalanced cultures.

Figure 1:
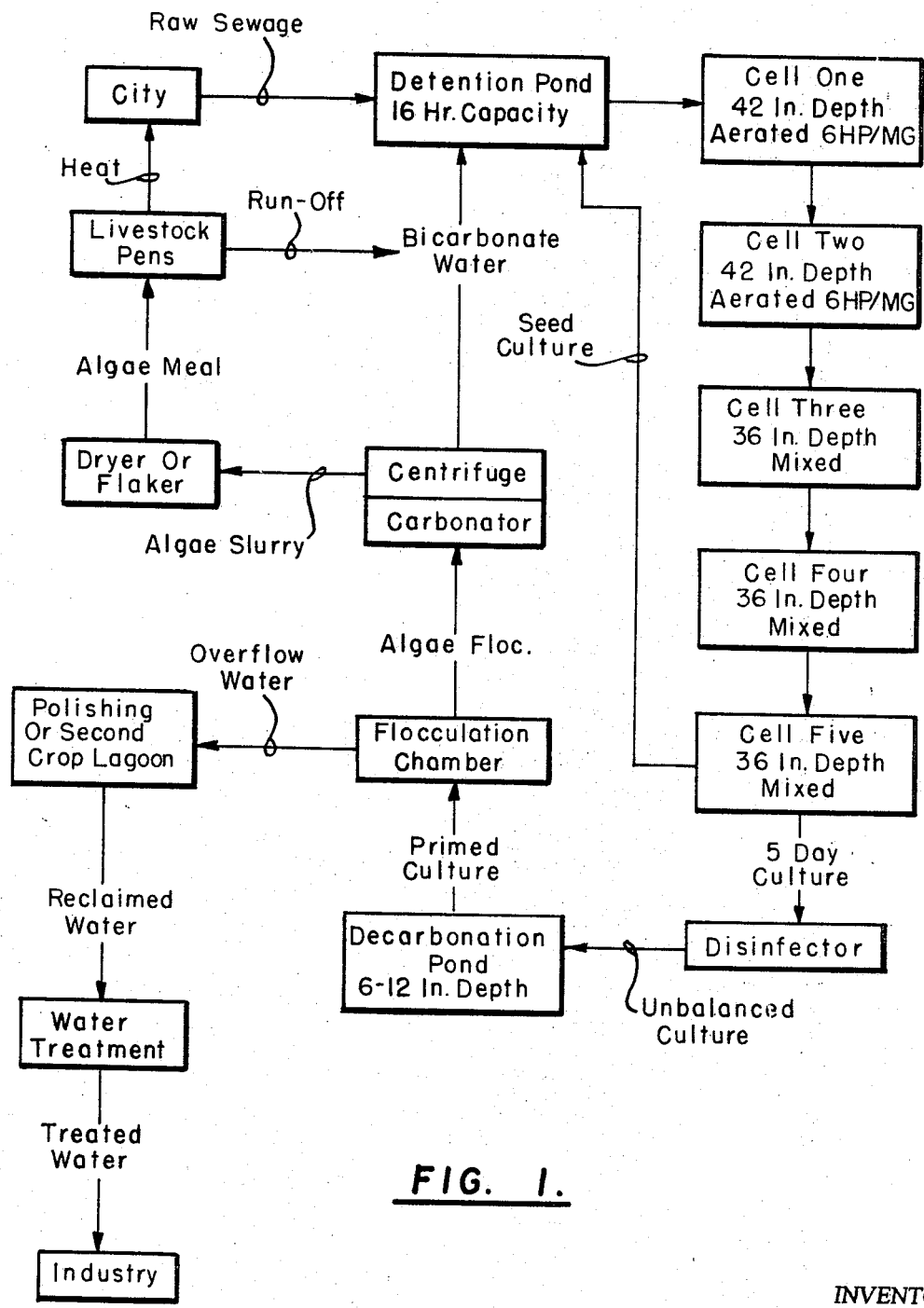
FIG. 1 is a diagrammatic representation of the flow of the various materials and the relationship of the steps, particularly with respect to disinfection and decarbonization.

This invention contemplates employment in large-scale production of algae for feeding operations, particularly as a major protein source and to a lesser extent a source of fats, carbohydrates, vitamins and minerals.

In practice algae, primarily chlorella, e.g., *Chlorella pyrenoidosa*, scenedesmus, e.g., *Scenedesmus obliquus*, and euglena, e.g., *Euglena gracilis*, are grown on sewage, which may be supplemented by agricultural fertilizers and carbon dioxide derived from the combustion of fuel used, e.g., for drying separated algae.

The invention employs certain facets of two well-known processes. The first of these is a phenomenon described by Oswald and Goleuke as autoflocculation. This process has no doubt been in operation for over half a billion years. The second is the lime-soda softening process which has been in use for perhaps 50 to 100 years. The heart of the invention lies in the use of artificial means of triggering autoflocculation and, in so doing, producing a very efficient variation of the lime-soda process.

Autoflocculation occurs when a culture of sewage-grown algae is actively photosynthesizing in a shallow, i.e. 4 to 5 inches deep, culture. After some time under these conditions the algae flocculate by themselves. Accompanying the flocculation are changes in pH, temperature and hardness. This phenomenon has been attributed to precipitation of hardness resulting from a rise in temperature and pH. More basically, the observed rise in pH is primarily brought about by the effect of the bactericidal ultraviolet wavelengths in the sunlight. The bactericidal range runs from 2200 to 3000 Angstroms, with a 2600 Angstrom optimum. The minimum solar wavelength at ground level is about 2920 Angstroms, but high intensity makes sunlight fairly effective as a germicide on bright days. Maximum effective penetration of the solar ultraviolet is several inches in an algal culture. With bacterial action substantially arrested, a symbiotic unbalance develops. Consequently, the production of carbon dioxide drops sharply and residual carbon dioxide is quickly assimilated by the algae. Uptake of the carbon dioxide produces a shift in the equilibrium equation indicated below:

(1)  $Ca^{++} + [2HCO_3^- \rightleftarrows CO_2 + CO_3^- + H_2O]$

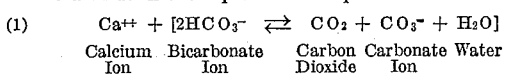

With carbon dioxide removal two things happen. First, the carbonate maintains equilibrium with bicarbonate and hydroxyl ions:

(2)  $CO_3^- + H_2O \rightleftarrows HCO_3^- + OH^-$

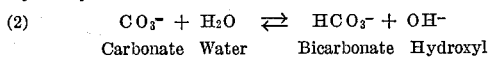

The algae now have the bicarbonate as a primary source of carbon dioxide. An increase in carbonate ion results in increased hydroxyl ion concentration and a rise in pH. When sufficient calcium ions are present, precipitation of calcium carbonate occurs. Precipitation usually occurs between a pH of 9.7 and 10.0.

If the pH exceeds a level of 10.0, magnesium precipitation may occur as indicated:

(3)  $Mg^{++} + [2HCO_3^- \rightleftarrows 2OH^- + 2CO_2]$

The precipitating hardness acts as centers or nuclei upon which algae agglomerate and settle.

The lime-soda process employs lime to remove carbon dioxide and carbonate hardness and soda ash to remove noncarbonate hardness. The process may be manipulated with close control to remove calcium hardness only. In terms of dosages required, the process chemieal data are:

| Chemical removed | Pounds chemical added per million gallons for each mg./l. of chemical removed | Chemical added |
|---|---|---|
| Carbon dioxide | 14.0 | Hydrated lime. |
| Magnesium | 25.4 | Do. |
| Bicarbonate alkalinity | 6.2 | Do. |
| Noncarbonate hardness | 8.84 | Soda ash. |

In practice, this softening process requires large amounts of lime and soda ash for waters of high hardness. By combining this process with autoflocculation, it is possible to allow an unbalanced culture to approach precipitation, then use lime-soda in much smaller amounts to complete the job. The reason for using lime-soda to culminate precipitation is simply control; precipitation occurs in the flocculation chamber, not in a pond. Selective calcium softening is normally desirable for two reasons: (1) The extra lime required may not be justified if the magnesium hydroxide precipitate does not appreciably improve flocculation. (2) Excessive magnesium hydroxide in the algae extracted could produce cathardic affects in a feeding operation.

As previously mentioned, the heart of this invention lies in the use of artificial means for triggering the autoflouculation without the benefit of strong sunlight. Disrupting the symbiotic balance may be accomplished in a number of ways, but the use of a bactericidal ultraviolet lamp is best. Exposure of a symbiotic culture to 2537 angstrom light of high intensity for a short time, e.g., 1 to 5 minutes, selectively inhibits bacterial action without appreciably affecting the aglae.

Chlorine disinfection may also be used, but the residual character of chlorine is detrimental to algae also. Use of ozone disinfection is an alternative to ultraviolet in desirability.

After disinfection, the culture is directed into a shallow pond (12 inches or less in depth). Here, under sunlight, decarbonation occurs and precipitation is approached or even attained in summertime. This primed culture is then pumped into a fluocculation chamber where sufficient lime-soda is added to culminate precipitation.

Lime and soda requirements are precisely computed from the analyses of water leaving the decarbonation pond according to the preceding table. The requirements for any given installation vary with seasonal changes, i.e. more chemical dosage is required in cooler weather because of lower temperature (reduced algal activity) and less light to drive the photosynthesis reaction. Transition is gradual. Each facility or installation has a particular correlation of pH to alkalinity and carbon dioxide for the local waste-water. Magnesium and noncarbonate hardness are essentially constant for a given locality. Once these determinations and pH correlation are established, dosage may be satisfactorily controlled on the basis of pH alone. Periodic checks on correlation are desirable, on perhaps a monthly basis. As an alternative, the flow from the decarbonation pond may be continuously monitored for all four items of said table, using commercially available sensing and recording equipment.

Going strictly on pH correlation, typical lime dosage might approximate the curve of FIG. 4, wherein the milligrams per liter of lime added is plotted against pH.

The settled algae floc is pumped through a recarbonation chamber where carbon dioxide from the heating unit of the algae dryer is used. The recarbonation puts precipitated hardness back into solution. The recarbonated floc then goes through a continuous centrifuge where further dewatering produces an algae slurry and a bicarbonate-rich water. The slurry is relatively free of excess minerals. The bicarbonate water may be partially recycled in areas where hardness and alkalinity of waters are low.

Hardness and alkalinity of waters involved in the process are of vital importance. In a water of low alkalinity, precipitating may be brought about fairly quickly, but because of the small number of nuclei formed, flocculation cannot be very effective. In waters of high alkalinity, the buffering capacity of the bicarbonate makes the time required in effecting precipitation much longer in comparision to low alkalinity waters. Density of the culture, of course, has an important bearing on the time required. A high density culture can more quickly deplete the bicarbonate buffer than a sparse culture. The ideal situation involves a high density culture with a high calcium level and relatively low alkalinity. From Equations 1 and 2 it can be seen that the equilibrium problem requires a compromise on alkalinity and calcium.

With reference to the drawings, raw sewage from a city is fed into a detention pond which is a nondescript pond of a nominal 16- to 24-hour capacity. The primary function of this pond is flow control, which can be effected, e.g., by a calibrated variable weir. The secondary function of the pond is sedimentation; seeding of the wastewater with recycled culture may also be accomplished in this pond (optional).

From the detention pond the settled sewage is transferred to a series of five growth cells. Within the growth unit incoming raw sewage is decomposed and made available to algae (as carbon dioxide, ammonia, etc.) by bacterial action. The density of algae growth increases greatly as the wastewater preceeds through the unit. Cells one and two, separated by a five-foot high concrete wall, have a capacity for about one days flow each, including recycled seed. They are fully and continually aerated by cage rotor aerators, at about 6-horsepower per million gallons. The aerators maintain circulation to minimize dead spots in addition to oxygenating the water. The operating depth is from 42 to 54 inches. In these cells, aeration and recycling from cell five promote rapid development of a bacterial population. The bacterial activity assures an abundance of nutrient available for algae growth. Cells three, four and five are primarily intended to produce a dense algae growth. Stirring and aerating of the culture are produced by slowly bubbling air from perforated lines on the cell bottom. The mixing tends to keep algae from settling, minimizes dead spots and provides needed oxygen during early morning hours. Air comes from a high volume compressor. In cold weather, hot carbon dioxide-rich air from the drying operation may be used. Agricultural fertilizers may also be added to supplement the sewage. The rolling motion produced by the bubbling also allows for more efficient use of light. The capacity of each cell is approximately one day's flow, and the operating depth is from 32 to 36 inches. The cells are interconnected. Approximately 10 percent by volume of cell five is recycled to the detention pond for seed.

From cell five the culture enters the initial step of flocculation in the disinfector where the effluent from cell five flows under a bank of ultraviolet lights at a depth of two to three inches. Normally a channel area of about 1000 square feet (length: width relationship is suitably 2 to 3:3 to 2, preferably 2 to 3:3) and about 2000 watts of fluorescent lamp power are required per million gallons of flow. The lamps, e.g., a 64-inch General Electric Germicidal Fluorescent 65 watt tube each irradiating an area 8⅓ by 4 feet, are suspended 8 to 12 inches above the culture surface. This disinfector is selectively effective in retarding bacterial action without affecting algal metabolism. Calculations for any given culture may be performed according to "Water Supply and Pollution Control" by Clark and Viessman, pages 476–479. Eightly-five percent disinfection is adequate and may be accomplished as described. Disinfection may also be accomplished by chlorination, ozonation, radiation or other means as outlined in Clark and Viessman, pages 463 through 488. By disrupting bacterial action, carbon dioxide production is greatly reduced and an unbalanced culture is rapidly achieved.

The unbalanced culture flows into a shallow (6 to 12 inches deep) decarbonation pond. Under strong sunlight the pH of the culture rises by the assimilation of carbon dioxide by the algae and the shift in the equilibrium of Equation 1, according to Equations 2 and 3. During midsummer a pH of 10.0 may be achieved in 5 hours or less at an operating depth of 6 to 8 inches. In midwinter an exposure for 9 hours may not be ample to produce a pH of 10.0. In order to alleviate the problem of algae settling in the decarbonation pond in summer operations, two alternatives are employed. First, by simply operating the decarbonation pond at a greater depth (10 to 12 inches), flocculation in the pond can be avoided or delayed. Second, stirring equipment may be installed, and flocculation be allowed to occur. This agitation keeps the floc material suspended and eliminates the need for any lime dosage in the flocculation chamber during summer operations. Equipment suitable for stirring has been assembled by using brushes, such as those employed with street sweeping machines. Such brushes, mounted horizontally and driven by an electrical motor at a speed of 5 to 10 r.p.m. do very well. Typically, a total axial length of 40 feet of brushes per million gallons per day capacity is adequate. Properly geared, a drive power of 5 to 6 horsepower will carry this load.

After the sun has gone down and photosynthesis is no longer in operation, the pH of the unbalanced culture remains relatively high and stable. FIG. 5 indicates the pH fluctuation of a normal balanced culture and that of an unbalanced culture.

The relative stability and high level of pH in the unbalanced culture allows the process to be operated on a continuous 24 hour basis. Only in the early morning hours does the pH of the unbalanced culture sag. This results from endogenous respiration of the algae and is especially pronounced after dissolved oxygen in the culture is depleted. Even this sag may be eliminated (FIG. 5) by the use of artificial illumination. Use of daylight type fluorescent lamps with a surface intensity of 50 to 100 lumens on a 6 inch-deep culture (300 mg./l. culture density) from midnight through 6 a.m. is adequate. For a culture of 12 inches depth illumination must be increased by a factor of 4. Light requirements vary with culture density similarly (i.e., with the square of the density or depth).

The culture flows from the decarbonation pond into the flocculation chamber continuously. Based upon analysis of carbon dioxide, bicarbonate alkalinity, magnesium and noncarbonate hardness of culture leaving the decarbonation pond, lime and soda ash are fed into the culture in the flocculation chamber. Capacity of the flocculation chamber should be adequate for a flow of 0.5 g.p.m. per square foot of surface area.

Using the settling hardness crystals as nuclei, the algae agglomerate and settle at the bottom of the chamber. [A contact sludge type softener such as a "Permutit Precipitator" makes a very efficient flocculation chamber.] Water overflowing from the flocculation chamber is directed to a five-day, 5-foot deep polishing pond (or lagoon) from which it can be reclaimed for industrial use. Alternatively, it can be fertilized and used to grow a second algae crop. The residual nutrient content of the water dictates the amount of agricultural fertilizer required and, thus, the economic advisability of this option.

In order to remove excessive mineral ash (especially magnesium, but also calcium), waste carbon dioxide from the dryer is bubbled through the flocculated algae just prior to centrifuging. Introduction of the carbon dioxide puts the precipitated mineral back into solution. Carbon dioxide is derived from the combustion of fuel for drying. The carbonator (or recarbonator) is optional.

The algae floc (averaging from 1.5 to 2.5 percent solids) is pumped to a continuous solid bowl (scroll-type) centrifuge. Such centrifuges are commercially available. The discharge from the centrifuge comprises a slurry having from 12 to 15 percent solids and a high hardness alkaline water, which may be partially recycled in soft water areas to improve flocculation efficiency.

From the centrifuge several alternatives exist. The algae slurry may be used for feed without further drying. It may be blended for pelleting in slurry form. Also it may be blended and flaked. Drying for bulk shipment does offer several advantages. It provides a carbon dioxide source for recarbonation and hot air to improve cold weather algae production. Any of a number of commercial dryers is satisfactory.

Centrifuge slurry may be fed into a boiler and cocked for, e.g., thirty minutes at from 95° to 100° C. The thus cooked algae meal is dried to 8 to 10 percent moisture in a double drum atmospheric dryer. The product from the dryer is temporarily stored in a bin awaiting transfer to a storage silo or hopper.

If livestock pens are operated adjacent the algae-culture, runoff and wastes may be directed to the growth cells and greatly increase nutrient availability. Should the livestock operation be sufficiently large, a second crop operation will be mandatory to achieve a reasonably high quality effluent.

The algae produced amounts to upwards of 1.5 tons per million gallons of domestic waste processed. The primary value of the algae is as a protein source for feeding of cattle, sheep, swine and poultry. The algae also contain significant amounts of phosphorus, calcium, potassium, carotene and other vitamins and minerals. The water produced, with ordinary sand filtration and disinfection, is superior to the original municipal supply water in many areas of the country. This is because of the softening and partial demineralization inadvertently accomplished by the process. Final hardness will run 2 to 3 grains. Biochemical oxygen demand (BOD) of effluent water normally runs 2 to 5 milligrams per liter.

In the entire cycle described, the essence of the invention lies in the disinfection, decarbonization and flocculation. FIGS. 2 and 3 illustrate the disinfector, which is ordinarily either square or rectangular. If 64-inch General Electric Germicidal Fluorescent 65 watt tubes are employed, it is convenient to place them in the same plane in parallel columns four feet apart and removed vertically three feet from the closest tubes in the same column. Thirty-one lamps cover slightly over 100 square feet with 2000 watts. The disinfector operates 24 hours per day. The dimensions of the disinfector are such that the flow therethrough takes from one to five minutes.

Such a disinfector covering an area of 3000 square feet (per million gallons per day) and having an ultraviolet intensity of 5 kilowatts (per million gallons per day) produces about 95% disinfection. However, 85% disinfection is satisfactory, and this is produced by an area of 1000 square feet (per million gallons per day) and an ultraviolet intensity of only 2 kilowatts (per million gallons per day).

The decarbonation pond covers an area of 3 acres per million gallons per day. The normal operating depth is 12 inches. During summer months the pH may exceed 10.0 in late afternoon and precipitation may occur before the culture leaves the decarbonation area. To keep the algae suspended, air from a high volume compressor is fed through perforated plastic lines. A 3.5 horsepower 40 cubic feet/minute compressor (per million gallons per day) is used to deliver air at 5 p.s.i.g. through ¾ inch lines. The lines are laid traversely, 20 feet apart in the final one-third of the pond area. Operation of the compressor is effected in summer only. Because of the irreversibility of the upward trend in pH imposed by disinfection, the culture is continuously fed from the decarbonation pond into the flocculator. Culture leaving the decarbonation pond ranges from as high as 11.0 in pH to as low as about 9.0, depending largely upon the season of the year. The culture is normally maintained in the decarbonation pond for twenty-four hours.

The flocculator simply consists of a "Permutit Precipitator" of appropriate size, operated as a cold lime softener. Because of the relatively low density of the algae-hardness agglomerate formed, the unit is operated at about 0.6 gallon per minute per square foot of surface area (compared to a 2.0 to 3.0 rate for ordinary softening). This amounts to about 1160 square feet per million gallons per day.

In this process disinfection is employed to upset symbiotic balance and to assist in producing a rise in pH to approach the precipitation-flocculation point. The use of disinfection to render the rise in pH irreversible allows flocculation on a 24-hour/day basis. Without disinfection a normal balanced culture pH may rise to about 10.0 in daylight and fall to 8.0 or lower at night. Disinfection precludes the downward shift at night, permitting continuous harvesting.

Combining disinfection with lime treatment to soften the water and to flocculate the algae, yields an even more advantageous result.

EXAMPLE

Flow: one million gallons per day.

(1) *Detention pond.*—Capacity approximately one million gallons nominally 5–8 feet deep, equipped with variable weir outlet. In this pond sewage flow from the city is received. Culture from cell five is recycled into this pond for seed. Normally 10% of flow is recycled.

(2) *Growth unit.*—(5 cells or ponds):

(A) Cells 1 and 2—Capacity approximately 1 million gallons each. Operating depth—42 inches—approximately 0.9 acre each. Aerated continuously by a 6 foot cage rotor aerator driven by a 6 HP motor. Cells consist of earthen walled pond partitioned by concrete dikes.

(B) Cells 3, 4, and 5—Capacity 1 million gallons each, approximately one acre plus area with an operating depth of 32 inches. Air (optionally enriched with carbon dioxide and ammonia) is slowly bubbled through culture in these cells through perforated lines in the pond bottom. A 30 c.f.m. compressor driven by a 2 HP motor supplies air. Ten percent of cell five culture is recycled to the detention pond.

(3) *Disinfector.*—Culture from cell 5 flows at 2 inches depth over a 1000 square foot concrete channel. Thirty-one 65 watt germicidal fluorescent lamps are suspended 8 inches above the channel (evenly distributed).

(4) *Decarbonation pond.*—Total area 4 acres. Average operating depth 10 (may vary from 6 to 12) inches. Normally full 4 acres is used only with 6 to 8 inch winter operating depth. Summertime 12 inch depth requires only about 2 acres. 40 feet of brush agitators driven by 5 HP motor allows shallow summer operation to be used. Typical analysis of decarbonation pond:

| Item | Analysis, mg./l. | Dosage (Per day) |
| --- | --- | --- |
| Carbon dioxide | 0.0 | 0 lb. lime. |
| Bicarbonate alkalinity | 20.0 | 124 lb. lime. |
| Magnesium | 10.0 | 254 lb. lime. |
| Noncarbonate hardness | 30.0 | 265.2 lb. soda. |

(5) *Flocculator.*—"Permutit Precipitator" of 1400 square feet area (0.5 gallon per minute per square foot). Chemical dosage is determined as indicated in the above table. (Slightly over-designed for high-flow tolerance).

(6) *Centrifuge.*—Dorr Oliver. Mercobowl Z–3L (or equivalent) "Floc" from the "precipitator" averages 1.5 to 2.0% solids. At the required throughput for 24 hour per day centrifuging, a final product of 20% solids is achieved. The centrifuge is operated at 66 g.p.m. (6 hrs./day) with 8% solids in discharge.

(7) *Drying.*—Using a drum dryer (General Food Products Equipment's G. D. 220), an 8 to 10 percent moisture final algae product is produced.

The preceding is merely illustrative and is in no way limitative. The invention is restricted only by express limitations in the claims.

What is claimed is:

1. In a process for photosynthetic conversion of organic waste which comprises culturing both algae and bacteria on the organic waste in symbiosis and subsequently harvesting the thus-cultured algae, the harvesting including any material flocculation or separation, the improvement comprising effecting bacterial disinfection prior to said harvesting to reduce the relative concentration of bacteria substantially without materially affecting the algae concentration, whereby an imbalance occurs and the symbiosis is disrupted.

2. A process according to claim 1 wherein the bacterial disinfection comprises 85 percent coliform reduction.

3. A process according to claim 1 wherein the bacterial disinfection comprises exposing said symbiotic culture to high-intensity ultra-violet light.

4. A process according to claim 3 wherein the light has a wave-length of about 2537 Angstrom units, the intensity is about 2000 watts per million gallons per day of symbiotic culture, and the culture is exposed to said intensity for from one to five minutes.

5. A process according to claim 1 wherein the algae are selected from the group consisting of chlorella, scenedesmus and euglena, and comprising decarbonating the resulting unbalanced culture and flocculating the thus-primed culture with lime and soda ash.

6. A process according to claim 5 wherein the bacterial disinfection is with high-intensity ultra-violet light.

7. A process according ot claim 6 wherein decarbonating is effected in a shallow pond by bright sunlight.

8. A process according to claim 7 wherein the ultra-violet light is of a wave-length of about 2537 Angstrom units and an intensity of about 2000 watts per million gallons per day of symbiotic culture.

9. A process according to claim 8 wherein the symbiotic culture is subjected to the bacterial disinfection for a period of from one to five minutes.

10. A channel capable of passing algal/bacterial symbiotic culture at a depth of from two to three inches and having an area of at least 1,000 square feet for each million gallons per day capacity of symbiotic culture in combination with an artificial source of ultra-violet light above the channel and having a wave-length of about 2537 Angstrom units and an intensity sufficient to effect material bacterial disinfection of bacteria in the symbiotic culture.

11. A combination according to claim 10 wherein the artificial source comprises a bank of germicidal fluorescent tubes fixed essentially in a plane parallel to the floor of the channel and from about eight to about twelve inches from said floor.

12. A process for disrupting algal/bacterial symbiosis which comprises passing fluid waste subjected to such symbiosis through a channel at a depth of from two to three inches for a period of from one to five minutes, subjecting the waste in the channel to artificial ultraviolet light having a wave-length of about 2537 Angstrom units and an intensity sufficient to effect material bacterial disinfection.

References Cited

UNITED STATES PATENTS

| | | | |
| --- | --- | --- | --- |
| 2,725,482 | 11/1955 | Levinson et al. | 21—2 XR |
| 2,732,663 | 1/1956 | Dewey | 47—1.4 |
| 2,867,945 | 1/1959 | Gotaas et al. | 47—1.4 |
| 3,385,786 | 5/1968 | Klock | 47—1.4 XR |
| 3,431,200 | 3/1969 | Davis et al. | 4—1.4 XR |

OTHER REFERENCES

Oswald et al., Algae in Waste Treatment, Sewage and Industrial Wastes, vol. 29, No. 4, April 1957, pp. 450–54 relied on.

Golueke et al., Harvesting and Processing Sewage-Grown Planktonic Algae, Water Pollution Control Federation Journal, vol. 37, No. 4, April 1965, pp. 478, 481, 483, 496 relied on.

ROBERT E. BAGWILL, Primary Examiner

U.S. Cl. X.R.

210—11, 18